United States Patent Office  3,468,927
Patented Sept. 23, 1969

3,468,927
PROCESS FOR PREPARING PIMELIC ACID AND A
2,2-DIALKYL-1,3-PROPANEDIOL
Roy B. Duke, Jr., Smyrna, Ga., and Milton A. Perry,
Longview, Tex., assignors to Eastman Kodak Company,
Rochester, N.Y., a corporation of New Jersey
No Drawing. Continuation-in-part of application Ser. No.
323,602, Nov. 14, 1963. This application Mar. 15, 1965,
Ser. No. 440,012
Int. Cl. C07c 69/74
U.S. Cl. 260—468                                    2 Claims

ABSTRACT OF THE DISCLOSURE

A non-catalytic condensation of an unsaturated alicyclic aldehyde and 2,2-disubstituted hydroxy-aldehyde to form unsaturated alicyclic glycol monoesters, which are useful intermediates in producing commercially important chemicals such as pimelic acid and glycols.

---

This application is a continuation-in-part of our copending U.S. patent application Ser. No. 323,602 filed Nov. 14, 1963, now abandoned.

The present invention relates generally to carboxylic esters and carboxylic acids, and more particularly to unsaturated carboxylic acid glycol esters having the formula:

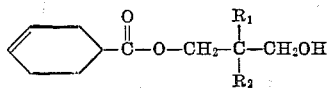

wherein each of $R_1$ and $R_2$ are lower alkyl, e.g., alkyl of 1 to 4 carbon atoms, and to the process of producing therefrom commercially important chemicals such as pimelic acid and glycols.

Several processes have been developed for the production of pimelic acid, which include the steps of caustic scission of an alkali metal salt of cyclohexene carboxylic acid. Each of the processes, however, differs in the precursor employed, and none of the processes have been sufficiently economical to warrant wide-spread commercial use.

It is, therefore, an object of the present invention to provide an improved process of producing an unsaturated alicyclic carboxylic acid and a glycol.

It is also a specific object of the present invention to provide an improved process of producing a pimelic acid.

It is a further object of the present invention to provide novel hydroxy esters of an unsaturated alicyclic carboxylic acid which have particular utility in a process of producing a pimelic acid and a glycol.

Other objects of the present invention will be apparent from the following detailed description and accompanying claims.

In the process of the present invention, a readily available unsaturated alicyclic aldehyde, such as 3-cyclohexene carboxaldehyde, is converted by means of a non-catalytic cross-aldehyde condensation into a novel glycol ester of an unsaturated alicyclic carboxylic acid by means of the process generally disclosed in copending application Ser. No. 323,602 and as specifically described hereinafter. Thereafter, the glycol ester precursor product is converted into pimelic acid and a glycol by a sequence of alcoholysis or saponification and caustic scission reactions. The foregoing general process of the present invention is illustrated by the following equations:

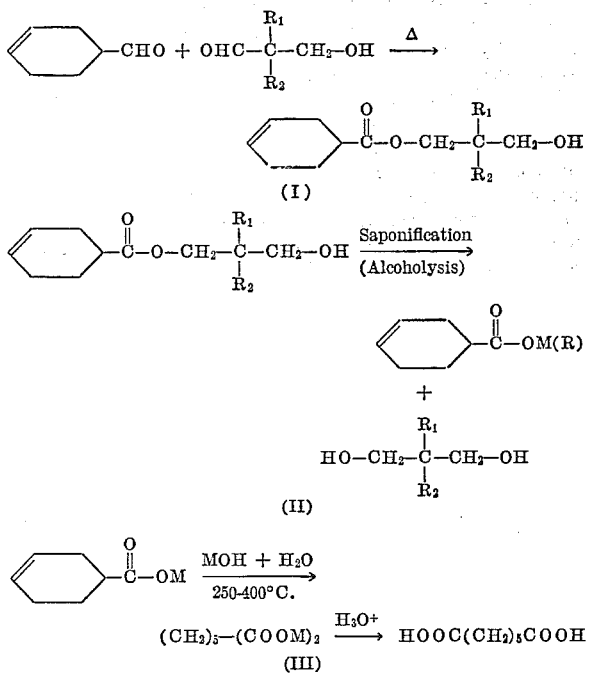

wherein $R_1$ and $R_2$ have the hereinabove defined values and M is an alkali metal.

The first step of the foregoing process comprises the non-catalytic crossed Tischenko condensation disclosed generally in our said copending U.S. patent application Ser. No. 323,602. The foregoing general reaction as applied to unsaturated alicyclic aldehydes, however, is unique in that it converts unsaturated alicyclic aldehydes, such as cyclohexene carboxaldehyde, totally into a precursor of a pimelic acid and provides a novel series of unsaturated alicyclic carboxylate products.

The aldols which can be used in the non-catalytic crossed Tischenko reaction of the present invention include compounds such as hydroxypivaldehyde; 2,2-diethyl-3-hydroxypropanal; 2,2-di-n-propyl - 3 - hydroxypropanal; 2,2-di-isopropyl - 3 - hydroxypropanal; 2,2-di-n-butyl-3-hydroxypropanal; 2-methyl - 2 - ethyl - 3 - hydroxypropanal; 2-ethyl - 2 - n-butyl-3-hydroxypropanal; and homologues and analogues thereof.

In the general practice of the present invention, the unsaturated alicyclic aldehyde is reacted with an aldol, e.g., hydroxypivaldehyde, at a temperature between about 100° C. to 300° C. for a period from about 2 to 48 hours in complete absence of any catalyst. Advantageously, from 3–5 moles of the aldehyde component per mole of the aldol component are employed. If desired, an inert solvent, such as benzene, toluene, xylene, or the like, can be used. Pressures equal to, above or below atmospheric pressures can be employed as desired. For carrying out the reaction under pressure conditions, i.e., up to about 500 p.s.i.g., an outoclave pressured with an inert gas, such as nitrogen, can be used. The products of the reaction can be isolated from the reaction mixture by conventional separation methods, as by fractional distillation.

Hydroxypivaldehyde, a preferred aldol for use in the process of the invention, can be prepared by condensing formaldehyde with isobutyraldehyde in the presence of a basic catalyst. In such condensations, an excess of the isobutyraldehyde is often employed and the crude reaction product is a mixture of hydroxypivaldehyde and isobutyraldehyde.

When reacting hydroxypivaldehyde prepared as described above with 3-cyclohexene-1-carboxaldehyde in accordance with the first steps of the herein disclosed process, the mixture of isobutyraldehyde and hydroxypivaldehyde is mixed with 3-cyclohexene-1-carboxaldehyde and heated in a distilling column where the excess isobutyraldehyde is removed as rapidly as possible to minimize the formation of neopentyl glycol monoisobutyrate by the competing cross-condensation reaction. When the temperature reaches about 160° C., essentially all the isobutyraldehyde is removed and the reactants are held at a temperature of between 100° C. and 300° C., preferably between about 130° C. and 160° C., until all of the hydroxypivaldehyde has reacted. The resulting product is a mixture of hydroxyneopentyl hydroxypivalate and hydroxyneopentyl 3-cyclohexene-1-carboxylate, from which the latter carboxylate product is readily purified by fractional distillation. The desired glycol ester, hydroxyneopentyl 3-cyclohexene-1-carboxylate, comprises between about 73 to 84% of the reaction mixture.

The alcoholysis or saponification treatment of the glycol ester which comprises the second step of the present process and the following caustic scission in combination provides a very economical and efficient process for producing pimelic acid and a glycol.

The following specific examples are for the purpose of further illustrating the present invention and should not be construed as limiting the invention to the particular reactants, conditions, or proportions used.

EXAMPLE 1

(A) Hydroxyneopentyl 3-cyclohexene-1-carboxylate

Hydroxypivaldehyde was prepared by condensing 35% formalin, 686 g. (8 moles), and isobutyraldehyde, 864 g. (12 moles), at 10–15° C., using sodium hydroxide (10–15 g.) as catalyst. After the condensation was complete, the sodium hydroxide was neutralized with dilute sulfuric acid and the crude aldol transferred to a separatory funnel where the aqueous layer was separated. The crude aldol was subsequently washed with three 100 ml. portions of water and then mixed with 800 g. of 3-cyclohexene-1-carboxaldehyde. The mixture was then distilled on a 10-plate Oldershaw column to a base temperature of 160° recovering 397 g. (5.52 moles) of isobutyraldehyde. The 3-cyclohexene-1-carboxaldehyde-hydroxypivaldehyde mixture was heated at 160° for 4 hours. The resulting mixture of hydroxyneopentyl esters was then distilled on an 18-inch Vigreux column. The distillation data is shown in the table.

TABLE

| Cut | B.P., °C. | Weight, g. | Product |
|---|---|---|---|
| 1 | Initial–70° C./1 mm | 419 | 3-cyclohexene-1-carboxaldehyde. |
| 2 | 70–110° C./1 mm | 93 | Neopentyl glycol monoisobutyrate. |
| 3 | 110–145° C./1 mm | 794 | Mixed esters. |
| 4 | Bottoms (200° C.+) | | |

Analysis of Cut 3 in several reactions showed it to contain between about 16 and 27% hydroxyneopentyl hydroxypivalate and between about 73 and 84% hydroxyneopentyl 3-cyclohexene-1-carboxylate. Pure hydroxyneopentyl 3-cyclohexene-1-carboxylate was obtained by careful fractionation of the product mixture.

(B) Pimelic acid-neopentyl glycol

A mixture (500 g.) containing 22% hydroxyneopentyl hydroxypivalate and 78% hydroxyneopentyl 3-cyclohexene-1-carboxylate, prepared as described in A, above, was added to 120 g. (3 moles) of sodium hydroxide dissolved in 500 ml. of water. The mixture was refluxed until saponification was complete. The aqueous alkaline solution was then extracted with isobutyl alcohol to remove the neopentyl glycol and the extracts subsequently distilled, yielding, 208 g. (2 moles) of peopentyl glycol (86%). An additional 120 g. (3 moles) of sodium hydroxide was dissolved in the aqueous phase and the solution placed in an autoclave and heated at 350° C. for 6 hours. The autoclave product was acidified and the pimelic acid filtered from the aqueous solution. The yield was 232 g. (1.45 moles) or 79% of theory.

EXAMPLE 2

A mixture (500 g.) containing 27% by weight hydroxyneopentyl hydroxypivalate and 73% by weight hydroxyneopentyl 3-cyclohexene-1-carboxylate obtained as in Example 1 was added to 120 g. (3 moles) of sodium hydroxide dissolved in 500 ml. of water. The mixture was refluxed until saponification was complete. The aqueous alkaline solution was then acidified and extracted with the organic solvent ether. Due to the pronounced water solubility of neopentyl glycol and hydroxypivalic acid, the ether extracts contained predominantly 3-cyclohexene-1-carboxylic acid. The aqueous solution was then extracted with an alcoholic solvent, isobutyl alcohol, to recover the neopentyl glycol and hydroxypivalic acid. The alcoholic extracts were distilled, recovering 214 g. (2.05 moles) of neopentyl glycol (87%). The ethereal solution was extracted four times with 200 ml. portions of 20% sodium hydroxide. The basic extracts were transferred to an autoclave and heated at 320–330° C. for 10 hours. The autoclave product was acidified with dilute sulfuric acid and the pimelic acid filtered from the aqueous solution, recovering 222 g. (1.39 moles) or 81%.

EXAMPLE 3

A mixture (500 g.) containing 27% hydroxyneopentyl hydroxypivalate and 73% hydroxyneopentyl 3-cyclohexene-1-carboxylate produced as in Example 1 was added to 120 g. (3 moles) of sodium hydroxide dissolved in 500 ml. of water. The mixture was refluxed until saponification was complete. The aqueous solution was acidified and then extracted with an alcoholic solvent, hexanol. The solvent was distilled from the saponification product and the mixture subsequently fractionated, recovering 200 g. (84%) neopentyl glycol, 62 g. (82%) hydroxypivalic acid, and 169 g. (77%) 3-cyclohexene-1-carboxylic acid. The cyclohexene carboxylic acid was dissolved in 500 ml. of water containing 120 g. of sodium hydroxide. This solution was acidified with dilute sulfuric acid and the pimelic acid filtered from the aqueous solution, recovering 158 g. (75%) pimelic acid.

EXAMPLE 4

A mixture (500 g.) containing 27% hydroxyneopentyl hydroxypivalate and 73% hydroxyneopentyl 3-cyclohexene-1-carboxylate produced as in Example 1 was added to 1000 g. of methanol containing 5 g. of sodium methoxide. The mixture was refluxed for 12 hours. Water was then added to destroy the alkoxide catalyst and the methanol subsequently distilled. The methyl esters were subsequently steam distilled yielding 202 g. (85%) methyl 3-cyclohexene-1-carboxylate. The aqueous solution from the steam distillation was extracted with isobutyl alcohol and the combined alcoholic extracts distilled, recovering 196 g. (79%) neopentyl glycol.

The methyl 3-cyclohexene-1-carboxylate was combined with 300 g. of water and 129 g. (3.22 moles) of sodium hydroxide in an autoclave and heated at 350° C. for 6 hours. The autoclave mixture was acidified and the pimelic acid filtered from the aqueous solution, recovering 177 g. (73%).

EXAMPLE 5

A mixture (500 g.) containing 27% hydroxyneopentyl hydroxypivalate and 73% hydroxyneopentyl 3-cyclohexene-1-carboxylate produced as in Example 1 was mixed with 500 g. of anhydrous ethanol in which 2 g. of sodium had been dissolved. The mixture was refluxed for 24 hours. Ammonium chloride (20 g.) was then added to neutralize the catalyst and the mixture subsequently filtered to remove the excess ammonium chloride and the sodium chloride formed. The excess ethanol was then distilled from the mixture and the esters and diol fractionated yielding ethyl 3-cyclohexene-1-carboxylate, 243 g. (92%), neopentyl glycol, 228 g. (92%), and ethyl hydroxypivalate, 89 g. (90%).

Ethyl 3-cyclohexene-1-carboxylate, 243 g. (1:58 moles) was combined with 195 g. (3.48 moles) of potassium hydroxide and 630 g. of water in an autoclave and heated at 340° C. for 4 hours. The autoclave product was acidified and the pimelic acid, 192 g. (76%), recovered by filtration. The aqueous solution was subsequently distilled to recover the ethyl alcohol.

EXAMPLE 6

Hydroxyneopentyl 3-cyclohexene-1-carboxylate (500 g.) obtained as in Example 1 was mixed with 500 g. of anhydrous ethanol in which 2 g. of sodium had been dissolved. The mixture was refluxed for 24 hours. Acetic acid (10 g.) was added to neutralize the catalyst and the excess ethanol was stripped from the product and the latter subsequently distilled, yielding 290 g. (80%) ethyl 3-cyclohexene-1-carboxylate and 184 g. (75%) neopentyl glycol. The ethyl 3-cyclohexene-1-carboxylate was placed in an autoclave with 166 g. (4.15 moles) of sodium hydroxide and 750 g. of water and heated at 350° C. for 5 hours. The autoclave product was acidified and the pimelic acid, 210 g. (70%), filtered from the aqueous solution. The ethanol was recovered from the aqueous solution by distillation.

While hydroxypivaldehyde has been used in the foregoing examples as the aldol for producing the glycol ester precursor, it will be understood that, where desired, other aldols can be used in which instance the corresponding glycols will be obtained along with pimelic acid.

Although the invention has been described in considerable detail with particular reference to certain preferred embodiments thereof, variations and modifications can be effected within the spirit and scope of the invention as described hereinbefore and as defined in the appended claims.

We claim:
1. A glycol ester of an unsaturated alicyclic acid having the formula:

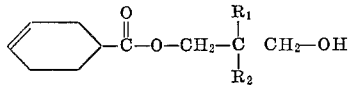

wherein each of $R_1$ and $R_2$ is lower alkyl.

2. Hydroxyneopentyl 3-cyclohexene-1-carboxylate.

References Cited

UNITED STATES PATENTS 3,114,766  12/1963  Knopf et al. ____ 260—468 XR

OTHER REFERENCES

Finch: "J. Org. Chem.," vol. 25, pp. 2219–2220 (1960).

LORRAINE A. WEINBERGER, Primary Examiner

P. J. KILLOS, Assistant Examiner

U.S. Cl. X.R.

260—514, 537, 635